(No Model.)
E. P. BENJAMIN.
MAKING MATRICES FOR PRINTING ROLLERS.
No. 350,654. Patented Oct. 12, 1886.
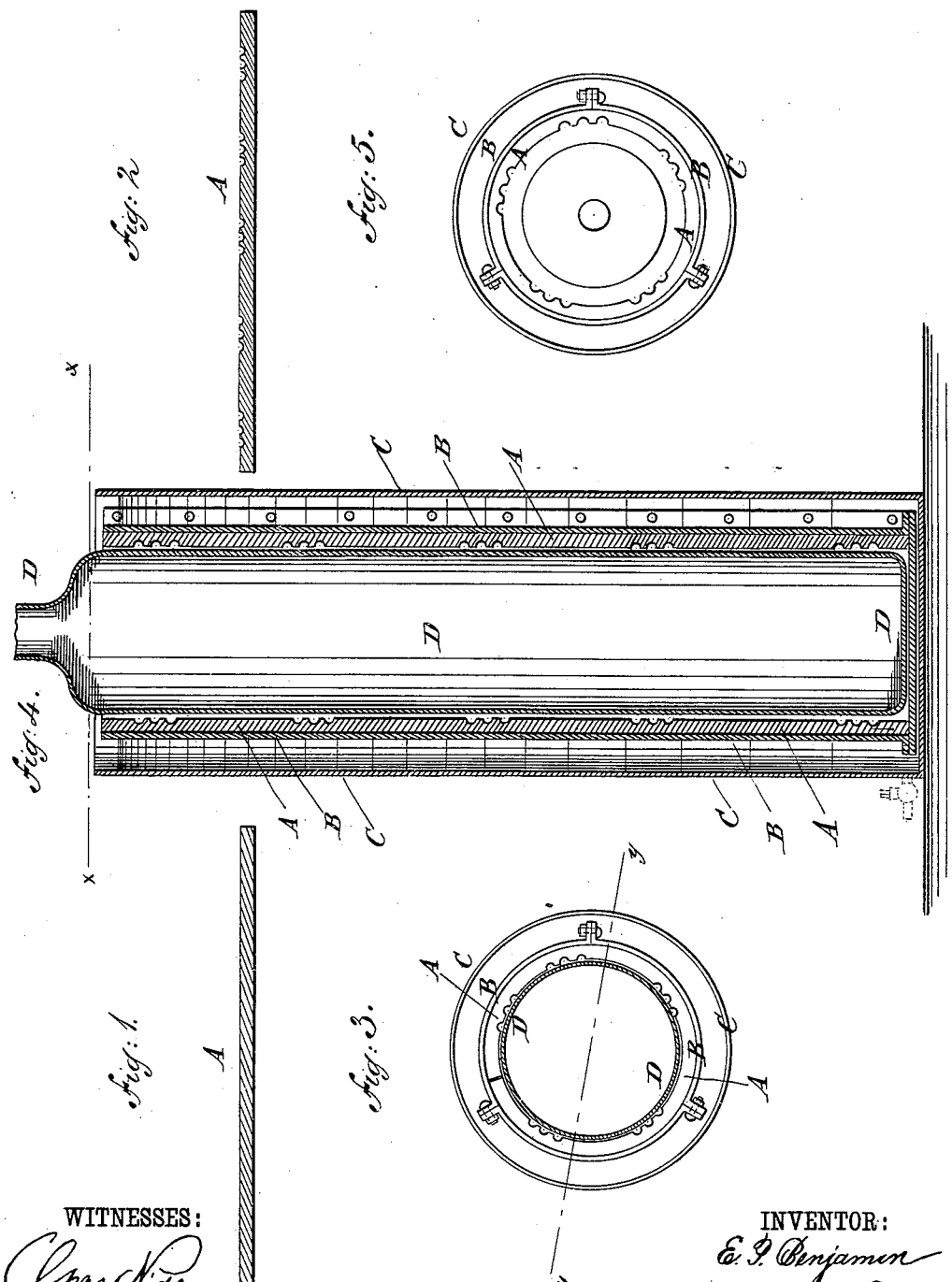
WITNESSES:
Chas. Nida
C. Sedgwick
INVENTOR:
E. P. Benjamin
BY Munn & Co.
ATTORNEYS.

United States Patent Office.

EDWIN P. BENJAMIN, OF MINETTO, ASSIGNOR OF ONE-HALF TO THE MINETTO SHADE CLOTH COMPANY, OF OSWEGO, NEW YORK.

MAKING MATRICES FOR PRINTING-ROLLERS.

SPECIFICATION forming part of Letters Patent No. 350,654, dated October 12, 1886.

Application filed February 5, 1886. Serial No. 190,932. (No model.)

*To all whom it may concern:*

Be it known that I, EDWIN P. BENJAMIN, of Minetto, county of Oswego, and State of New York, have invented a new and Improved Process for Making Matrices for Printing-Rollers, of which the following is a full, clear, and exact description.

Reference is to be had to the accompanying drawings, forming a part of this specification, in which similar letters of reference indicate corresponding parts in all the figures.

Figure 1 is a sectional edge view of a pattern-plate before having the pattern formed upon it. Fig. 2 is a sectional edge view of a pattern-plate after having the pattern formed upon it. Fig. 3 is a plan view, partly in section through the line $x$ $x$, Fig. 4, of the apparatus for bringing the pattern-plate into the form of a true hollow cylinder. Fig. 4 is a sectional side elevation of the same, taken through the line $y$ $y$, Fig. 3. Fig. 5 is a plan view of the same, the rubber bag being removed.

The object of this invention is to provide, and it consists in, an improved process for making matrices for printing-rollers, as will be hereinafter fully described.

In carrying my improved process into practical effect I heat gutta-percha sufficiently to soften it into a dough, and then work into it plumbago, in the proportion of one pound of plumbago to three pounds of gutta-percha, by passing it repeatedly between heated rollers until the plumbago and gutta-percha are thoroughly intermingled, when it is passed through rollers and reduced to plates, A, of about one-quarter of an inch thickness, and of such a length and breadth as will form hollow cylinders of the required size. A plate A is then placed in a hydraulic press between two heated metallic plates, upon the face of one of which is formed the desired pattern, and sufficient pressure is applied to imprint the pattern into the said gutta-percha plate. The gutta-percha plates A are then planed upon the smooth side, to give them a uniform thickness. A gutta-percha plate A is then heated in warm water until it becomes sufficiently pliable to be bent into the form of a hollow cylinder and placed in a cylindrical case, B, which is made with a close bottom, and may be made in one piece or in sections tightly bolted together. The latter construction is shown in the drawings. The inner surface of the case B is turned to give it a true cylindrical form and make the said inner surface smooth. The case B is then placed in a larger cylindrical case, C, and the space between the two cases B C is filled with warm water to keep the gutta-percha pliable. A cylindrical rubber bag, D, is then placed within the cylindrical gutta-percha plate A, and air is forced into it with an air-pump or other suitable means until sufficient pressure is obtained to force the gutta-percha plate A firmly against the inner surface of the case B, and thus bring it to the form of a true hollow cylinder. The warm water between the cases B C is then drawn off and replaced with cold water to cool the gutta-percha plate and cause it to set in the form of a true hollow cylinder, forming a matrix. The rubber bag D is then removed from the matrix A and the matrix withdrawn from the case B, when it is ready to be used for casting gelatine printing-rollers, in the manner described in my application for a patent filed in the Patent Office November 20, 1885, and having the serial number 183,426.

It should be observed that the pattern must be so formed upon the gutta-percha plate A that its edges, when the edges of the said gutta-percha plate are brought together, will exactly coincide, so that the printing-roller cast in the matrix will print a continuous design upon the paper or cloth to which it may be applied.

Having thus fully described my invention, I claim as new and desire to secure by Letters Patent—

1. The process for making matrices for printing-rollers, which consists in placing a properly-prepared plate capable of being softened and rendered pliable by heat inside a cylinder, softening said plate by the application of heat, shaping it to the inner surface of said cylinder, and then setting the said plate by cooling it, substantially as set forth.

2. The process for making matrices for printing-rollers, which consists in mixing gutta-percha and plumbago, and then passing the mixture, when warm, between two rollers to reduce it to a plate, then imprinting the pattern upon one side of the plate by placing it between two plates in a hydraulic press, then planing the smooth side of the plate to give the said plate a uniform thickness, then warming the plate, bending it into the form of a hollow cylinder and placing it in a cylindrical case placed in a larger cylindrical case, then filling the space between the two cases with warm water to soften the gutta-percha, then placing a cylindrical rubber bag within the gutta-percha cylinder and applying an air-pressure to force the gutta-percha cylinder against the inner surface of the inner case and give it a true cylindrical form, then replacing the warm water with cold water to set the gutta-percha, and then removing the rubber bag and withdrawing the matrix from the case, all substantially as described.

EDWIN P. BENJAMIN.

Witnesses:
JAMES T. GRAHAM,
EDGAR TATE.